United States Patent [19] [11] Patent Number: 4,687,804
Shiraishi et al.  [45] Date of Patent: Aug. 18, 1987

[54] EXTERIOR BODY PART FOR AUTOMOTIVE VEHICLE

[75] Inventors: Masao Shiraishi; Yoshinori Nishiya; Syoji Ito, all of Mie, Japan

[73] Assignee: Mitsubishi Petrochemical Co., Ltd., Tokyo, Japan

[21] Appl. No.: 928,582

[22] Filed: Nov. 10, 1986

Related U.S. Application Data

[63] Continuation-in-part of Ser. No. 749,978, Jun. 28, 1985, abandoned.

[30] Foreign Application Priority Data

Jun. 30, 1984 [JP] Japan .................. 59-134106

[51] Int. Cl.$^4$ ............................. C08L 53/00
[52] U.S. Cl. ..................... 524/505; 428/31; 524/525; 524/526; 525/89
[58] Field of Search ............ 525/89, 940; 524/525, 524/526, 505; 428/31

[56] References Cited

U.S. PATENT DOCUMENTS 3,299,174 1/1967 Kuhre et al. ............... 525/940 X
3,576,913 4/1971 Johnson et al. ............ 525/89 X
3,970,771 7/1976 Davison ..................... 428/425
4,006,116 2/1977 Dominguez .................. 525/89 X
4,371,662 2/1983 Tone et al. ................. 525/89

Primary Examiner—Theodore E. Pertilla
Attorney, Agent, or Firm—Sughrue, Mion, Zinn, Macpeak & Seas

[57] ABSTRACT

Exterior body part for an automotive vehicle, such as bumpers and facers, are described, which are made of a thermoplastic resin composition comprising: 100 parts of a block copolymer represented by the formula: A(B-A)$_n$ (wherein the symbols are the same as defined before), 40 to 300 parts by weight of a propylene/α-olefin block copolymer resin, 0 to 50 parts by weight of a softening agent for nonaromatic rubber, and 0 to 200 parts by weight of an ethylene/α-olefin copolymer rubber. This thermoplastic resin composition has excellent flexibility, heat distortion resistance, mechanical strength, and scratch resistance, and furthermore, exhibits good workability.

17 Claims, No Drawings

EXTERIOR BODY PART FOR AUTOMOTIVE VEHICLE

CROSS-REFERENCE TO RELATED APPLICATION

This application is a continuation-in-part of U.S. Ser. No. 749,978, filed June 28, 1985, now abandoned.

FIELD OF THE INVENTION

The present invention relates to an exterior body part for an automotive vehicle, such as a bumper and a facer, and more particularly, it relates to an exterior body part for an automotive vehicle comprising a thermoplastic resin composition having excellent flexibility, heat distortion resistance, mechanical strength, scratch resistance, and moldability.

BACKGROUND OF THE INVENTION

In recent years, thermoplastic elastomers (hereinafter referred to as "TPE" for simplicity) having excellent flexibility, heat distortion resistance, and mechanical strength, and which is capable of molding like thermoplastic resins without the vulcanization step have received increasing attention in the fields of automobile parts, electric appliance parts, electric wire coatings, footwear, miscellaneous goods, etc.

Various types of polymers such as polyolefin-, polyurethane-, polyester-, polystyrene-, and polyvinyl chloride-based polymers are used as the TPE.

Of those TPE, polystyrene-based TPE such as a styrene/butadiene block copolymer (SBS) and a styrene/isoprene block copolymer (SIS) have an excellent flexibility and a good mechanical strength, and can also provide TPE compositions having an excellent workability. Those polymers, however, have a poor heat aging resistance (heat stability) and weatherability due to the fact that they contain double bonds as conjugated diene blocks in the molecule.

An elastomer having an improved heat stability can be obtained by hydrogenating double bonds in the molecule of the styrene/conjugated diene block polymers. Processes for producing such hydrogenated block copolymers are described in, for example, Japanese Patent Publication Nos. 8704/67, 6636/68, 20504/70 and 3555/73. In addition, TPE compositions using those hydrogenated block copolymers have been proposed. For example, Japanese Patent Application (OPI) Nos. 14742/75 and 65551/77 (the term "OPI" as used herein refers to a "published unexamined Japanese patent application") disclose compostions comprising hydrogenated styrene/conjugated diene block copolymers and hydrocarbon oils or α-olefin polymers.

The TPE compositions using the hydrogenated products of styrene/conjugated diene block copolymers, however, are not sufficiently satisfactory in flowability in the production of a large-sized exterior body part for an automotive vehicle, such as bumpers and facers, by injection molding. In order to improve such a poor flowability, it may be considered to increase the amount of a softening agent added. If, however, the amount of the softening agent added is increased, the mechanical strength is decreased. In particular, the scratch resistance is seriously decreased. Thus, the final exterior body parts tend to be easily scratched and their appearance is deteriorated.

An attempt has been made to improve such poor flowability and scratch resistance by adding a propylene homopolymer or a propylene/ethylene random copolymer. In this case, however, the impact strength at low temperatures is not sufficient. Thus, the resulting compositions are unsuitable for use, in particular, in the production of an exterior body part for an automotive vehicle.

SUMMARY OF THE INVENTION

As a result of various investigations to overcome the above-described problems on the appearance characteristics, flexibility, mechanical strength, flowability and scratch resistance and also impact resistance at low temperature, it has been found that the problems can be overcome by adding a propylene-based block copolymer to a hydrogenated block copolymer which is an excellent TPE.

Accordingly, an object of the present invention is to provide an exterior body part for an automotive vehicle comprising a thermoplastic resin composition having excellent flexibility, heat distortion resistance, mechanical strength, scratch resistance and moldability.

The exterior body part for an automotive vehicle according to the present invention comprises a thermoplastic resin composition comprising:

100 parts by weight of a hydrogenated product of a block copolymer represented by the formula:

wherein A is a polymer block of a monovinyl-substituted aromatic hydrocarbon, B is an clastomeric polymer block of a conjugated diene, and n is an integer of from 1 to 5;

60 to 200 parts by weight of a propylene/α-olefin block copolymer resin of from 10 to 100 g/10 minutes;

0 to 50 parts by weight of a softening agent for a nonaromatic rubber; and 0 to 200 parts by weight of an ethylene/α-olefin copolymer rubber.

The results of the present invention, i.e., providing a composition having excellent properties as an exterior body part for automobile vehicles are obtained only when a propylene/ethylene blocked copolymer having an MFR of 10 to 100 g/10 minutes is used in a specific amount of 60 to 200 parts by weight.

DETAILED DESCRIPTION OF THE INVENTION

In the block copolymer represented by the formula: A(B-A)$_n$, the monomer which constitutes the polymer block A, i.e, monovinyl-substituted aromatic hydrocarbon, is preferably styrene. In addition, α-methylstyrene and the like can be used. As the conjugated diene monomer in the polymer block B, butadiene or isoprene is preferably used. In addition, a mixture of butadiene and isoprene can be used. When butadiene is used as a single conjugated diene monomer to form the polymer block B, in order that the resulting block copolymer remains an elastomeric property even after the saturation of double bonds by hydrogenation, it is preferred to employ polymerization conditions that the proportion of the 1,2-microstructure in the polybutadiene block is from 20 to 50%. It is more preferred that the proportion of the 1,2-microstructure be from 35 to 45%.

It is preferred that the number average molecular weight of the polymer block A in the block copolymer be from 5,000 to 125,000, and the number average molecular weight of the polymer block B be from 15,000 to 250,000. The proportion of the polymer block B in the whole block copolymer is at least 65 wt %.

Many methods have been proposed as a process for producing those block copolymers. A representative process is described in Japanese Patent Publication No. 23798/65, for example, in which block copolymerization is carried out in an inert solvent in the presence of a lithium catalyst or Tiegler-type catalyst.

The block copolymer is then subjected to hydrogenation treatment in an inert solvent in the presence of a hydrogenation catalyst by the method described in, for example, Japanese Patent Publication No. 8704/67, 6636/68 or 20814/71. By this hydrogenation treatment, at least 50%, preferably 80% or more, of olefinic double bonds in the polymer block B are hydrogenated, and 25% or less of aromatic unsaturated bonds in the polymer block A are hydrogenated. An example of hydrogenated block copolymers which are commercially available is "KRATON-G" (trade name) produced by Shell Chemical Corp.

The propylene/α-olefin block copolymer resin which is added to the above hydrogenated TPE resin has an MFR (melt flow rate) value of 10 to 100 g/10 min. Examples of α-olefins which are copolymerized with propylene include ethylene and butene-1. Ethylene is preferred.

The amount of the propylene/α-olefin block copolymer resin added is from 60 to 200 parts by weight, per 100 parts by weight of the above hydrogenated TPE resin. If the amount of the propylene/α-olefin block copolymer added is less than 60 parts by weight, the resulting composition is not sufficiently satisfactory in flowability. As a result, its workability in injection molding is poor and its scratch resistance is also not sufficiently high. On the other hand, if the amount of the propylene/α-olefin block copolymer added is more than 200 parts by weight, the stiffness of the resulting composition is too high, and its low temperature impact strength is unsatisfactory.

The thermoplastic resin composition used in the present invention can contain up to a certain amount of a softening agent. Softening agents for rubbers can be used. Suitable examples thereof are nonaromatic mineral oils and liquid or low molecular weight synthetic softening agents. The softening agent for rubber is a mixture of aromatic rings, naphthenic rings, and paraffinic chains. A softening agent in which the number of carbon atoms in the paraffinic chains is at least 50% of the total number of carbon atoms is called a paraffinic softening agent. Softening agents in which the number of carbon atoms in the naphthenic rings is 30 to 45% and the number of carbon atoms in the aromatic rings is more than 30% are called naphthenic and aromatic softening agents, respectively. As mineral oil-based softening agents used in the thermoplastic resin composition, the naphthenic and paraffinic softening agents are preferred to use. On the other hand, the aromatic softening agent in which the number of carbon atoms is at least 30% is not preferred in respect of dispersibility in the composition. With regard to the characteristics of the softening agent for nonaromatic rubber, the dynamic viscosity is from 20 to 500 centistokes at 37.8° C., the fluid point is from −10° to 15° C., and the flash point is from 170° to 300° C.

Synthetic softening agents which can be used include polybutene and low molecular weight polybutadiene. However, the above mineral oil-based softening agent provides better results.

The amount of the softening agent added is 50 parts by weight or less per 100 parts by weight of the hydrogenated TPE resin. If the amount of the softening agent added is more than 50 parts by weight, the resulting composition decreases the tensile strength and, furthermore, the scratch resistance of the molding surface is seriously decreased.

The thermoplastic resin composition which can be used in the present invention can contain as well as the above propylene/α-olefin block copolymer, an ethylene/α-olefin copolymer rubber, particularly an amorphous random copolymer rubber comprising ethylene, α-olefin, and nonconjugated diene. Examples of the α-olefins are propylene, butene-1, and hexene-1. Examples of the nonconjugated dienes are dicyclopentadiene, 1,4-hexadiene, cyclooctadiene, methylnorbornene, and ethylidene norbornene.

Copolymer rubbers produced using propylene as the α-olefin are preferably used. In this case, the propylene content is appropriately from 25 to 50 wt %. If the propylene content is too small, the resulting composition may be deficient in flexibility. On the other hand, if it is too large, the mechanical strength of the composition is decreased.

The Mooney viscosity, $ML_{1+4}^{100}$, of the copolymer rubber is from 10 to 120 and preferably from 10 to 100. If the Mooney viscosity is less than 10, an improvement in the heat distortion resistance of the composition cannot be expected. On the other hand, if it is more than 120, the workability is reduced and the appearance of the molded article tends to be deteriorated.

The amount of the copolymer rubber added is 200 parts by weight or less, preferably up to 100 parts by weight, per 100 parts by weight of the hydrogenated TPE resin. If the amount of the copolymer rubber added is more than 200 parts by weight, the mechanical strength of the composition is decreased and, furthermore, its scratch resistance is decreased.

Inorganic fillers such as talc, calcium carbonate, and mica can be added to the thermoplastic resin composition as used in the present invention within ranges not seriously deteriorating the effects of the present invention. In addition, as in conventional resin compositions, additives such as pigments, heat stabilizers, antioxidants, and ultraviolet absorbers can be added to the thermoplastic resin composition, if desired.

The above-described ingredients are melt kneaded to prepare the thermoplastic resin composition. The exact proportion of each ingredient is determined depending on the purpose of use of the thermoplastic resin composition used.

This kneading process can be carried out using conventional kneaders such as a single screw extruder, a twin screw extruder, a Banbury mixer, a roll, a Brabender plastograph, and a kneader.

Large-sized exterior body parts for automotive vehicle can be easily produced by injection molding the thermoplastic resin composition. The scratch resistance of the molded article thus produced is greatly increased without any reduction in the mechanical strength and low temperature impact resistance. The workability of the thermoplastic resin composition can be further increased by adding rubber softening agents and ethylene/α-olefin copolymer rubbers within ranges not seriously reducing the scratch resistance and mechanical strength.

The thermoplastic resin composition is well balanced between elasticity and low temperature impact strength, and has an excellent scratch resistance and flowability. Accordingly, the thermoplastic resin composition is most suitable for use in the production of exterior body parts for automotive vehicle such as a bumper and a facer, by injection molding.

The thermoplastic resin composition can be molded with conventional thermoplastic resin extruders by molding techniques such as injection molding, extrusion molding, blow molding, and calender molding.

Typical examples of exterior body parts for automotive vehicle are a flexible bumper, a side bumper, a braid, a filer panel, and an air intake horse.

The present invention is described in greater detail by reference to the following examples.

The testing methods employed in the examples are as follows.
(1) MFR (g/10 min.)
    Measured according to JIS-K 7210 (23° C., 2.16 kg).
(2) Bending Modulus (kg/cm$^2$)
    Measured according to JIS-K 7203 (23° C.).
(3) Tensile Strength (kg/cm$^2$) and Tensile Elongation (%)
    Measured according to JIS-K 7113 (23° C.)
(4) Brittle Temperature
    Measured according to JIS-K 6750; shock is applied to a test piece at −30° C. and the state in which the test piece is broken is examined.
(5) Spiral Flow (mm)
    Measured according to the Mitsubishi Petrochemical method as follows:
    A mold with a flow path provided in a spiral form (half-circular pitch: 21 mm), the flow path having a half-circular cross section having a diameter of 6 mm, is used, and a kneaded material is injection molded through a gate in the center of the spiral. The length (flow distance) of the spiral thus injection molded is determined based on a scale of 5 mm as engraved in a small depth in the inner surface of the flow path.
    It is necessary for the spiral flow to be at least 500 mm in order to mold large-scaled articles.
    The measurement conditions are as follows:
    Injection molding machine:
    SJ 35-50Z Puss-type 40 mm diameter screw manufactured by Meiki Seisakusho.
    Molding conditions:
        Molding temperature: 240° C.
        Molding pressure: 800 kg/cm$^2$
        Injection rate: 50 g/sec.
        Mold temperature: 40° C.
(6) Scratch Resistance: Scratch Load Wc (g)
    A test piece is placed on a scratch tester (manufactured by Shindo Co., Ltd.) with a 0.5 R sapphire needle and moved straight at a speed of 150 mm/min under a static load varied for each test by 100 g within the range of 100 to 1,000 g. The depth of a scratch is measured with a surface roughness tester, and the relationship between the static load W and the depth of the scratch D is established. Based on this relationship a value of W corresponding to D=5 μm is determined, and it is defined as a scratch load Wc.

The ingredients of the compositions used in the examples and comparative examples are shown below.
(a) Hydrogenated TPE resin
    KRATON-C-1652 produced by Shell Chemical Co., Ltd. (Brookfield viscosity as determined at 77° F. as a 20 wt % toluene solution: 550 cps)
(b-1) Propylene/ethylene block copolymer resin
    Produced by Mitsubishi Petrochemical Co., Ltd. (ethylene content: 7 wt %; MFR: 45 g/10 min.)
(b-2) Propylene homopolymer resin
    MA2 produced by Mitsubishi Petrochemical Co., Ltd.
(b-3) Propylene/ethylene random copolymer resin MG1B
(c) Rubber softening agent
    Diana Process Oil PW-90 produced by Idemitsu Kosan Co., Ltd. (paraffinic; dynamic viscosity: 95.54 cst (40° C.), 11.25 cst (100° C.); average molecular weight: 539; ring analytical value: $C_N$=29.0% and $C_P$=71.0%)
(d) Ethylene/propylene copolymer rubber
    Ethylene content: 74 wt %; Mooney Viscosity $ML_{1+4}^{100}$: 23.

COMPARATIVE EXAMPLE

The above-described ingredients were blended in the proportions shown in Table 1, mixed for 2 minutes in a super mixer (manufactured by Kawada Seisakusho), and kneaded and pelletized at 220° C. using a PCM twin screw kneader (manufactured by Ikegai Tekko Co., Ltd.). Pellets of each composition were molded at 240° C. using a screw in-line injection molding machine to produce a test piece. This test piece was measured for mechanical properties and scratch resistance. In addition, the appearance of the samples was evaluated by visually observing the presence of flow males, surface unevenness, etc. The results obtained are shown in Table 1.

Brittle temperature at −40° C. was also used to evaluate some of the samples. This factor is useful in determining whether a test sample has sufficient impact resistance at low temperatures for use as an exterior body part for automotive vehicles.

The compositions of Examples 1 to 2 and Comparative Examples 8–10 were each molded into an automobile bumper using a large-sized injection molding machine. The bumper could be sufficiently molded.

TABLE 1

|  | Examples | | | Comparative Examples | | | | | | | | |
|---|---|---|---|---|---|---|---|---|---|---|---|---|
|  | 1 | 2 | 3 | 1 | 2 | 3 | 4 | 5 | 6 | 7 | 8 | 9 |
| Composition (parts by weight) | | | | | | | | | | | | |
| KRATON-G1652 | 100 | 100 | 100 | 100 | 100 | 100 | 100 | 100 | 100 | 100 | 100 | 100 |
| Propylene/Ethylene Block Copolymer | 100 | 140 | 200 | 30 | 120 | 400 | 100 | 400 | 0 | 0 | 50 | 300 |
| Propylene Homopolymer | 0 | 0 | 0 | 0 | 0 | 0 | 0 | 0 | 100 | 0 | 0 | 0 |
| Propylene/Ethylene Random Copolymer | 0 | 0 | 0 | 0 | 0 | 0 | 0 | 0 | 0 | 100 | 0 | 0 |
| Rubber Softening Agent | 0 | 10 | 0 | 0 | 60 | 0 | 20 | 0 | 0 | 0 | 0 | 0 |
| Ethylene/Propylene Copolymer Rubber | 0 | 0 | 100 | 0 | 0 | 0 | 70 | 300 | 0 | 0 | 0 | 0 |
| Quality | | | | | | | | | | | | |
| MFR (g/10 min) | 8.4 | 9.7 | 13.3 | 2.3 | 15.0 | 14.7 | 17.3 | 10.2 | 5.3 | 8.5 | 6.2 | 10.5 |
| Bending Modulus (kg/cm$^2$) | 3000 | 2650 | 2960 | 1400 | 1800 | 7500 | 4500 | 2800 | 3800 | 3500 | 1680 | 6200 |
| Tensile Strength (kg/cm$^2$) | 340 | 225 | 145 | 380 | 110 | 410 | 75 | 83 | 400 | 380 | 360 | 390 |
| Tensile Elongation (%) | 570 | 520 | 520 | 650 | 400 | 550 | 600 | 530 | 600 | 610 | 500 | 700 |

TABLE 1-continued

|  | Examples | | | Comparative Examples | | | | | | | | |
|---|---|---|---|---|---|---|---|---|---|---|---|---|
|  | 1 | 2 | 3 | 1 | 2 | 3 | 4 | 5 | 6 | 7 | 8 | 9 |
| Brittle Temperature (−30° C.) | O | O | O | O | O | x | x | O | x | x | O | O |
| Brittle Temperature (−40° C.) | O | O | O | — | — | x | — | x | — | — | — | x |
| Spiral Flow (mm) | 590 | 610 | 700 | 370 | 820 | 750 | 890 | 620 | 500 | 595 | 530 | 630 |
| Scratch Load (g) | 530 | 500 | 400 | 210 | 160 | 500 | 220 | 180 | 550 | 540 | 350 | 465 |
| Appearance (Flow Mark, etc.) | good | good | good | bad | good | good | good | bad | good | good | bad | good | o: Not Broken;
x: Broken

COMPARATIVE EXPERIMENT 2

Using the ingredients as shown in Tables I and II below, compositions were prepared in the same manner as in the above Comparative Example 1 and the test pieces prepared from the compositions were subjected to the evaluations in the same manner as defined in Comparative Example 1.

In addition to Component (b-1) used in Comparative Example 1, the following Components (b-11), (b-12) and (b-13) were used as the propylene/ethylene block copolymer.

(b-11)—Propylene/ethylene block copolymer resin having ethylene content of 7 wt % and MFR of 10 g/10 min., produced by Mitsubishi Petrochemical Co., Ltd.

(b-12)—Propylene/ethylene block copolymer resin having ethylene content of 7 wt % and MFR of 80 g/10 min., produced by Mitsubishi Petrochemical Co., Ltd.

(b-13)—Propylene/ethylene block copolymer resin having ethylene content of 10 wt % and MFR of 1 g/10 min., produced by Mitsubishi Petrochemical Co., Ltd.

Component (b-2), MA2, had MFR of 25 g/10 min., and Component (b-3), MG1B, had ethylene content of 1 wt % and MFR of 40 g/10 min.

The evaluation results obtained are shown in Tables 2 and 3 below together with the data shown in Table 1 of the present invention.

TABLE 2

|  | Examples | | |
|---|---|---|---|
|  | 4 | 5 | 6 |
| Composition (Parts by weight) | | | |
| KRATON-G1652 | 100 | 100 | 100 |
| Propylene/Ethylene Block Copolymer | | | |
| (b-1) MFR 45 g/10 min. | 70 | 0 | 0 |
| (b-11) MFR 10 g/10 min. | 0 | 100 | 0 |
| (b-12) MFR 80 g/10 min. | 0 | 0 | 100 |
| (b-13) MFR 1 g/10 min. | 0 | 0 | 0 |
| Propylene Homopolymer | | | |
| MA2 MFR 25 g/10 min. | 0 | 0 | 0 |
| Propylene/Ethylene Random Copolymer | | | |
| MG1B MFR 40 g/10 min. | 0 | 0 | 0 |
| Rubber Softening Agent | 0 | 0 | 0 |
| Ethylene/Propylene Copolymer Rubber | 0 | 0 | 0 |
| Quality | | | |
| MFR (g/10 min.) | 6.9 | 3.9 | 11.0 |
| Bending Modulus (kg/cm$^2$) | 2100 | 2960 | 3030 |
| Tensile Strength (kg/cm$^2$) | 365 | 345 | 340 |
| Tensile Elongation (%) | 530 | 540 | 500 |
| Brittle Temperature (−30° C.) | O | O | O |
| Brittle Temperature (−40° C.) | O | O | O |
| Spiral Flow (mm) | 550 | 400 | 680 |
| Scratch Load (g) | 410 | 535 | 540 |
| Appearance (Flow Mark, etc.) | good | good | good |

O: not broken
x: broken

TABLE 3

|  | Comparative Examples | |
|---|---|---|
|  | 10 | 11 |
| Composition (Parts by weight) | | |
| KRATON-G1652 | 100 | 100 |
| Propylene/Ethylene Block Copolymer | | |
| (b-1) MFR 45 g/10 min. | 0 | 350 |
| (b-11) MFR 10 g/10 min. | 0 | 0 |
| (b-12) MFR 80 g/10 min. | 0 | 0 |
| (b-13) MFR 1 g/10 min. | 100 | 0 |
| Propylene Homopolymer | | |
| MA2 MFR 25 g/10 min. | 0 | 0 |
| Propylene/Ethylene Random Copolymer | | |
| MG1B MFR 40 g/10 min. | 0 | 0 |
| Rubber Softening Agent | 0 | 0 |
| Ethylene/Propylene Copolymer Rubber | 0 | 0 |
| Quality | | |
| MFR (g/10 min.) | 0.6 | 12.8 |
| Bending Modulus (kg/cm$^2$) | 2900 | 6900 |
| Tensile Strength (kg/cm$^2$) | 430 | 400 |
| Tensile Elongation (%) | 640 | 620 |
| Brittle Temperature (−30° C.) | O | x |
| Brittle Temperature (−40° C.) | x | x |
| Spiral Flow (mm) | 230 | 680 |
| Scratch Load (g) | 510 | 490 |
| Appearance (Flow Mark, etc.) | bad | good |

O: not broken
x: broken

COMPARATIVE EXPERIMENT 3

Using the ingredients as shown in Tables 4 and 5 below, compositions were prepared in the same manner as in Comparative Example 1 and the test pieces prepared from the compositions were subjected to the evaluations in the same manners as defined above.

In addition to Component (b-1) used in the Comparative Example 1, the following Components (b-11) - (b-15) were used as the propylene/ethylene block copolymer.

(b-11)—Propylene/ethylene block copolymer resin having ethylene content of 7 wt % and MFR of 10 g/10 min., produced by Mitsubishi Petrochemical Co., Ltd.

(b-12)—Propylene/ethylene block copolymer resin having ethylene content of 7 wt % and MFR of 80 g/10 min., produced by Mitsubhish Petrochemical Co., Ltd.

(b-13)—Propylene/ethylene block copolymer resin having ethylene content of 10 wt % and MFR of 1 g/10 min., produced by Mistsubishi Petrochemical Co., Ltd.

(b-14)—Propylene/ethylene block copolymer resin having ethylene content of 6 wt % and MFR of 4 g/10 min., produced by Mitsubishi Petrochemical Co., Ltd.

(b-15)—Propylene/ethylene block copolymer resin having ethylene content of 7 wt % and MFR of 7.5 g/10 min., produced by Mitsubhishi Petrochemical Co., Ltd.

Component (b-2), MA2, had MFR of 25 g/10 min., and component (b-3), MG1B, gad ethylene content of 1 wt % and MFR of 40 g/10 min.

Further, the hydrogenated TPE resin used was the same KRATON-G1652 as used in the Comparative Example 1.

The evaluation results obtained are shown in Tables 4 and 5 below.

TABLE 4

| | Examples | | |
|---|---|---|---|
| | 7 | 8 | 9 |
| Composition (Parts by weight) | | | |
| KRATON-G1652 | 100 | 100 | 100 |
| Propylene/Ethylene Block Copolymer | | | |
| (b-1) MFR 45 g/10 min. | 60 | 150 | 200 |
| (b-11) MFR 10 g/10 min. | 0 | 0 | 0 |
| (b-12) MFR 80 g/10 min. | 0 | 0 | 0 |
| (b-13) MFR 1 g/10 min. | 0 | 0 | 0 |
| Propylene Homopolymer | | | |
| MA2 MFR 25 g/10 min. | 0 | 0 | 0 |
| Propylene/Ethylene Random Copolymer | | | |
| MG1B MFR 40 g/10 min. | 0 | 0 | 0 |
| Rubber Softening Agent | 0 | 0 | 0 |
| Ethylene/Propylene Copolymer Rubber | 0 | 0 | 0 |
| Quality | | | |
| MFR (g/10 min.) | 6.7 | 9.1 | 9.8 |
| Bending Modulus (kg/cm$^2$) | 1850 | 3800 | 4500 |
| Tensile Strength (kg/cm$^2$) | 360 | 355 | 370 |
| Tensile Elongation (%) | 510 | 600 | 610 |
| Brittle Temperature (−30° C.) | O | O | O |
| Brittle Temperature (−40° C.) | O | O | O |
| Spiral Flow (mm) | 540 | 600 | 610 |
| Scratch Load (g) | 400 | 510 | 495 |
| Appearance (Flow Mark, etc.) | good | good | good |

O: not broken
x: broken

TABLE 5

| | Examples | |
|---|---|---|
| | 12 | 13 |
| Composition (Parts by weight) | | |
| KRATON-G1652 | | |
| Propylene/Ethylene Block Copolymer | | |
| (b-1) MFR 45 g/10 min. | 0 | 0 |
| (b-11) MFR 10 g/10 min. | 0 | 0 |
| (b-12) MFR 80 g/10 min. | 0 | 0 |
| (b-13) MFR 1 g/10 min. | 0 | 0 |
| (b-14) MFR 4 g/10 min. | 100 | 0 |
| (b-15) MFR 7.5 g/10 min. | 0 | 100 |
| Propylene Homopolymer | | |
| MA2 MFR 25 g/10 min. | 0 | 0 |
| Propylene/Ethylene Random Copolymer | | |
| MG1B MFR 40 g/10 min. | 0 | 0 |
| Rubber Softening Agent | 0 | 0 |
| Ethylene/Propylene Copolymer Rubber | 0 | 0 |
| Quality | | |
| MFR (g/10 min.) | 2.4 | 3.0 |
| Bending Modulus (kg/cm$^2$) | 2900 | 2950 |
| Tensile Strength (kg/cm$^2$) | 430 | 440 |
| Tensile Elongation (%) | 650 | 640 |
| Brittle Temperature (−30° C.) | O | O |
| Brittle Temperature (−40° C.) | — | — |
| Spiral Flow (mm) | 280 | 330 |
| Scratch Load (g) | 525 | 520 |
| Appearance (Flow Mark, etc.) | bad | bad |

O: not broken
x: broken

As can be seen from Tables 1-5, the composition used in the present invention has excellent flowability, good balance between rigidity and flexibility, excellent tensile elongation, excellent impact resistance at low temperature, excellent scratch resistance and good appearance. Thus, the composition according to the present invention has sufficient physical properties in all aspects for use as an exterior body part for an automotive vehicle.

On the other hand, it is apparent that the composition which is outside the scope claimed in the present invention does not have sufficient physical properties for use as an exterior body part for automotive vehicle.

While the invention has been described in detail and with reference to specific embodiments thereof, it will be apparent to one skilled in the art that various changes and modifications can be made therein without departing from the spirit and scope thereof.

What is claimed is:

1. An exterior body part for an automotive vehicle comprising a thermoplastic resin composition, said composition comprising:

100 parts by weight of the hydrogenated product of a block copolymer represented by the formula:

$$A(B-A)_n$$

wherein A is a polymer block of a monovinyl-substituted aromatic hydrocarbon, B is an elastomeric polymer block of a conjugated diene, and n is an integer of 1 to 5;

60 to 200 parts by weight of a propylene/α-olefin block copolymer resin having an MFR value of from 10 to 100 g/10 minutes;

0 to 50 parts by weight of a softening agent for nonaromatic rubber; and 0 to 200 parts by weight of an ethylene/α-olefin copolymer rubber.

2. An exterior body part as in claim 1, wherein the monovinyl-substituted aromatic hydrocarbon is styrene.

3. An exterior body part as in claim 1, wherein the conjugated diene is a monomer selected from the group consisting of butadiene, isoprene and the mixture thereof.

4. An exterior body part as in claim 1, wherein the conjugated diene is butadiene and the proportion of 1,2-microstructure in the polybutadiene block is from 20 to 50%.

5. An exterior body part as in claim 4, wherein the proportion of the 1,2-microstructure is from 35 to 45%.

6. An exterior body part as in claim 1, wherein the polymer block A has a number average molecular weight of form 5,000 to 125,000 and the polymer block B has a number average molecular weight of from 15,000 to 250,000.

7. An exterior body part as in claim 1, wherein the proportion of the polymer block B in the whole copolymer is at least 65% by weight.

8. An exterior body part as in claim 1, wherein at least 50% of olefinic double bonds in the polymer block B are hydrogenated and 25% of less of aromatic unsaturated bonds in the polymer block A are hydrogenated.

9. An exterior body part as in claim 8, wherein at least 80% of the olefinic double bonds are hydrogenated.

10. An exterior body part as in claim 1, wherein the α-olefin in the propylene/α-olefin block copolymer is ethylene or butene-1.

11. An exterior body part as in claim 10, wherein the α-olefin is ethylene.

12. An exterior body part as in claim 1, wherein the softening agent is a naphthenic or paraffinic softening agent.

13. An exterior body part as in claim 1, wherein the α-olefin in the copolymer rubber is propylene and the propylene content therein is from 25 to 50% by weight.

14. An exterior body part as in claim 1, wherein the copolymer rubber has a Mooney viscosity, $ML_{1+4}^{100}$, of from 10 to 120.

15. An exterior body part as in claim 14, wherein the Mooney viscosity is from 10 to 100.

16. An exterior body part as in claim 1, wherein the amount of the copolymer rubber is up to 100 parts by weight.

17. A bumper for an automotive vehicle comprising a thermoplastic resin composition, said composition comprising:

100 parts by weight of the hydrogenated product of a block copolymer represented by the formula:

$$A(B-A)_n$$

wherein A is a polymer block of a monovinyl-substituted aromatic hydrocarbon, B is an elastomeric polymer block of a conjugated diene, and n is an integer of 1 to 5;

60 to 200 parts by weight of a propylene/α-olefin block copolymer resin having an MFR value of 10 to 100 g/10 minutes;

0 to 50 parts by weight of a softening agent for nonaromatic rubber; and 0 to 200 parts by weight of an ethylene/α-olefin copolymer rubber.

* * * * *